United States Patent
Camara et al.

(10) Patent No.: US 7,659,763 B2
(45) Date of Patent: Feb. 9, 2010

(54) CONDITIONING INPUT BUFFER FOR CLOCK INTERPOLATION

(75) Inventors: Hibourahima Camara, Wappingers Falls, NY (US); Sergey V. Rylov, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/041,913

(22) Filed: Mar. 4, 2008

(65) Prior Publication Data

US 2009/0224811 A1    Sep. 10, 2009

(51) Int. Cl.
   *H03K 3/013* (2006.01)
(52) U.S. Cl. .............. 327/292; 327/108; 327/238; 327/294; 327/299; 713/503
(58) Field of Classification Search ......... 327/247–249, 327/258, 371, 372, 108, 238, 292, 294, 299; 713/503; 326/82
See application file for complete search history.

(56) References Cited

U.S. PATENT DOCUMENTS

| | | | |
|---|---|---|---|
| 6,009,534 | A | 12/1999 | Chiu et al. |
| 6,255,876 | B1 | 7/2001 | Chen et al. |
| 6,359,488 | B2 * | 3/2002 | Nakajima ............... 327/281 |
| 6,727,741 | B2 | 4/2004 | Huang et al. |
| 7,205,811 | B2 * | 4/2007 | Freyman et al. ......... 327/247 |
| 7,266,169 | B2 * | 9/2007 | Zhang .................... 375/375 |
| 2002/0021775 | A1 * | 2/2002 | Dietl et al. ............... 375/354 |
| 2006/0022734 | A1 | 2/2006 | Huang et al. |
| 2007/0127612 | A1 * | 6/2007 | Lee et al. ................. 375/355 |
| 2007/0153951 | A1 * | 7/2007 | Lim et al. ................ 375/376 |

OTHER PUBLICATIONS

Kromer et al., "A 25-Gb/s CDR in 90-nm CMOS for High-Density Interconnects", IEEE Journal of Solid-State Circuits, vol. 41, No. 12, Dec. 2006, pp. 2921-2929.
Ping et al., "A Low-Jitter Frequency Synthesizer with Dynamic Phase Interpolation for High-Speed Ethernet", IEEE International Symposium on Circuits and Systems (ISCAS 2006), May 21-24, 2006, pp. 2481-2484.

\* cited by examiner

*Primary Examiner*—Lincoln Donovan
*Assistant Examiner*—William Hernandez
(74) *Attorney, Agent, or Firm*—Stephen J. Walder, Jr.; Diana R. Gerhardt

(57) ABSTRACT

A conditioning buffer is provided for a clock interpolator that controls the duration of the clock edges to achieve high-linearity interpolation. The conditioning buffer includes a first buffer and a second buffer, with a fixed or variable strength, that receive their respective inputs from a set of mutually delayed clock signals, such as a set of N equidistant clock phases with mutual delay of 360/N degrees, to form a two-tap transversal filter that is insensitive to changes in Process, Temperature, and Voltage (PVT). Use of an equidistant set of clock phases makes the time constant of such transversal filter proportional to the clock period thus making it insensitive to changes in clock frequency as well. Such transversal filtering action operated in conjunction with natural bandwidth limitations of the buffers yields an efficient clock conditioning circuit that is highly insensitive to PVT and clock frequency variations.

19 Claims, 4 Drawing Sheets

CONDITIONING INPUT BUFFER FOR CLOCK INTERPOLATION

BACKGROUND OF THE INVENTION

1. Field of the Invention

The present application relates generally to an improved data processing apparatus and method and more specifically to an apparatus and method for providing a conditioning input buffer for clock interpolation.

2. Background of the Invention

High-precision phase interpolators are essential for generation and distribution of low-jitter clock signals in modern high-speed applications, such as microprocessors and Gigabit serial communication links. Such phase interpolators are typically used in situations where clock signals are not synchronized and thus misalignment and errors are possible.

One modern application of phase interpolators is in modern broadband communications equipment. Such broadband communications are typically fiber optic in nature with data transmissions via these fiber optic links being serial streams of data, but within a network component, such as a switch, relay, bridge, etc., the data is processed in parallel. In order to process such data, these network components typically have a serialization/de-serialization transceiver whose transmitter converts parallel data into serial data and whose receiver receives serial data and converts it back into parallel data. Because the clock signals of the transceivers of the various components are not synchronized, misalignment is possible and errors in the sampling of data at the receiver may be encountered.

Phase interpolators are also often used in microprocessor circuitry. For example, phase interpolators are often used in phase locked loops (PLLs), or delay locked loops (DLLs), for correcting the misalignment between clock signals, such as at asynchronous clock circuit boundaries.

BRIEF SUMMARY OF THE INVENTION

In one illustrative embodiment, a conditioning buffer circuit is provided. The conditioning buffer circuit may comprise a first buffer that receives a first input signal and a second buffer, coupled to the first buffer, that receives a second input signal. The first input signal may have a first delay and the second input signal may have a second delay different from the first delay. The first input signal and the second input signal may be signals obtained from a set of mutually delayed signals. The conditioning buffer circuit may output a conditioned output signal based on a combination of a first output of the first buffer and a second output of the second buffer.

In yet another illustrative embodiment, a clock phase interpolator circuit is provided. The clock phase interpolator circuit may comprise at least one clock generator circuit, at least one clock conditioning buffer circuit coupled to the at least one clock generator circuit, and a clock phase interpolator coupled to the at least one clock conditioning buffer circuit. Each clock conditioning buffer circuit of the at least one clock conditioning buffer circuit may comprise a first buffer that receives a first clock input signal and a second buffer, coupled to the first buffer, that receives a second clock input signal. The first clock input signal may have a first phase delay and the second clock input signal may have a second phase delay different from the first phase delay. The first clock input signal and the second clock input signal may be clock signals obtained from a set of clock signals having different phase delays generated by the at least one clock generator circuit. The conditioning buffer circuit may output a conditioned clock output signal to the clock phase interpolator based on a combination of a first output of the first buffer and a second output of the second buffer.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
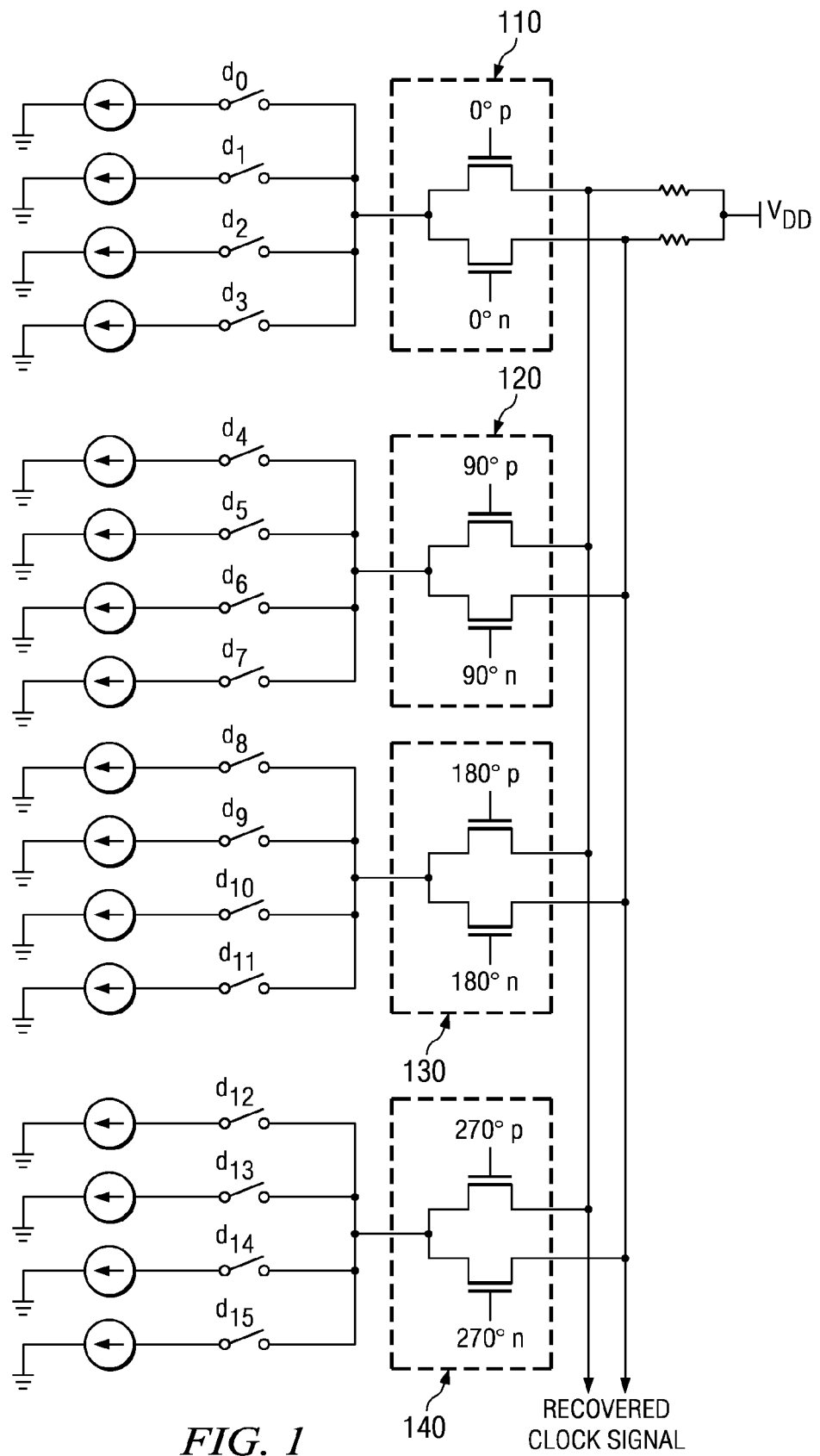
FIG. 1 is one example of a phase interpolator with which the mechanisms of the illustrative embodiments may be implemented.

As discussed above, high-precision phase interpolators are essential for the generation and distribution of low-jitter clocks in modern high-speed applications. FIG. 1 is one example of a phase interpolator with which the mechanisms of the illustrative embodiments may be implemented. The phase interpolator of FIG. 1 may be used, for example, in a delay locked loop (DLL) of a digital communication system. As shown in FIG. 1, the phase interpolator employs several fixed clock phases (e.g., 0 degrees, 90 degrees, 180 degrees, and 270 degrees), supplied externally and applied to differential transistor pairs 110-140, and creates a phase-controlled interpolated clock, which is between 0 degrees and 360 degrees with certain fixed steps. For example, the phase interpolator of FIG. 1 can produce 16 phases of a reference clock with steps corresponding to 360 degrees divided by 16. The selection of a particular phase is based on the enablement of switches D0-D15.

As shown, each switch controls a current source that, when the switch is enabled, couples the current source to the output (e.g., the recovered clock signal) via a transistor. For example, if the desired phasing of the recovered clock signal is 0 degrees, switches D0-D3 are enabled and the remaining switches are disabled. For a phase shift of 360 degrees divided by 16, switches D1-D4 are enabled while D0 and D5-D15 are disabled. Accordingly, each phase step is achieved by enabling various combinations of the switches.

Proper operation of clock phase interpolators, such as the one shown in FIG. 1 above, depends critically on driving the phase interpolator with clock waveforms having substantially mutually overlapping edges. This is because, if the clock waveforms do not have substantially mutually overlapping edges, undefined zero crossing moments are generated that result in high timing jitter, as discussed in greater detail hereafter. The requirement to have substantially mutually overlapping edges presents a challenge if the phase interpolator has to operate across a substantially frequency range, e.g., one octave or more, and/or has an extended process/voltage/temperature (PVT) range over which the phase interpolator must maintain its proper operation.

Therefore, in order to provide a greater likelihood that the clock waveforms have substantially mutually overlapping edges, special clock conditioning buffers, preceding the phase interpolators, may be used to satisfy the edge-overlapping requirement. The special clock conditioning buffers are essentially filters that aim to suppress high order harmonics of the input clock waveform in order to make it look reasonably close to a sine wave, which has well defined zero crossing points which can be more easily overlapped. The challenge, however, is to match the time constant of the filter, i.e. the special clock conditioning buffers, which is PVT dependent, with the input clock frequency which can vary according to the requirements of an application.

For example, in the case of a substantial mismatch in time constant of the filter, i.e. special clock conditioning buffers, with the input clock frequency, the filtering may become either insufficient, making the clock edges too sharp for proper interpolation, or too excessive such that the clock amplitude is severely degraded causing increased clock jitter. While one can adjust the filter time constant by using a closed-loop feedback system, such a solution is too expensive for most applications due to extra power and area requirements of the closed-loop feedback system.

The illustrative embodiments provide a mechanism for matching the time constant of a special clock conditioning buffer to the input clock frequency using a technique that is efficient both with regard to power consumption and integrated circuit chip area. The illustrative embodiments take advantage of other clock phases available in a system, such as a set of four quadrature clock phases that are typically available in circuits employing clock interpolators. Availability of these extra clock phases allows easy implementation of a two-tap transversal filter that performs a function of clock de-emphasis, i.e. stretching of clock rise and fall edges. The term "tap" as it is used herein refers to a copy of the input clock signal, e.g., an original clock signal is one tap and a delayed copy of the clock signal is a second tap. A conventional transversal filter works by generating a weighted sum of multiple, e.g., two, mutually delayed copies of the input signal that are commonly obtained using a multi-tap delay line.

To realize a transversal filter, the illustrative embodiments do not actually delay the input clock phase, but instead use the next lagging clock phase from the available phase set typically provided at the input of clock phase interpolators. That is, as shown in FIG. 1, a clock phase interpolator receives a full set of 4 clock phases uniformly distributed on a phase circle (0, 90, 180, and 270 degrees). Having four fixed clock phases is referred to as having "quadrature." As a result of having a fixed set of clock phases within a clock period from which to select, the tap-to-tap delay of the transversal filter of the illustrative embodiments is a fixed fraction of a clock period, e.g., ¼ of a clock period for a set of four quadrature phases, and hence its time constant automatically adjusts to the clock frequency in a sense that it comprises a fixed fraction (¼) of a clock period. While a two-tap transversal filter is too crude to filter out high harmonics from the clock signal, it extends substantially the range of operation of regular fixed-time-constant clock conditioning buffers when used in conjunction with them.

In other words, a pure two-tap transversal filter alone cannot provide all the required clock shape conditioning, however, the two-tap transversal filter never operates alone because a certain amount of filtering with a fixed (however PVT-dependent) timing constant is always present within a circuit either due to its natural bandwidth limitations or due to it being an intentional feature of the design. Therefore, by adding a new filtering mechanism (which provides two-tap transversal filtering with a tap-to-tap delay equal to a fixed portion of a clock period) a new "dual-mechanism" filter is obtained which is more tolerant of PVT changes. Moreover, this dual-mechanism filter is more tolerant of clock frequency changes. Thus, this new transversal filtering mechanism is both PVT-independent and automatically tracks the clock frequency due to its time constant being a fixed fraction of the clock period.

Figure 2A:
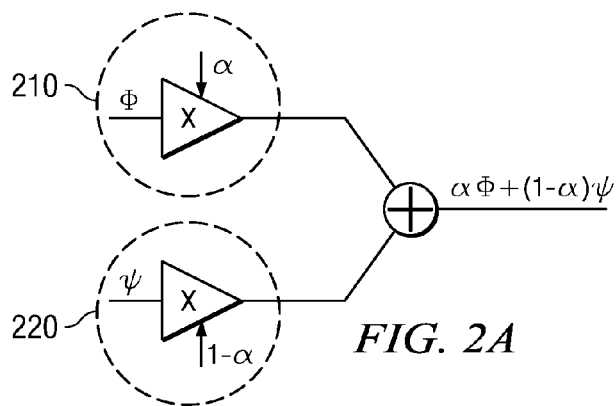
FIG. 2A illustrates a mathematical model representation of a clock phase interpolator.

As mentioned above, one of the critical requirements for proper operation of a clock phase interpolator is to have substantially mutually overlapping edges. To explain this further, FIG. 2A illustrates a mathematical model representation of a clock phase interpolator. As shown in FIG. 2A, a first buffer 210 receives a first clock signal having a first phase $\phi$ and a control input having an interpolation weight of $\alpha$. A second buffer 220 receives a second clock signal having a second phase $\psi$ and a control input having an interpolation weight of $1-\alpha$. The clock phase interpolator essentially generates a weighted sum of the clock signal inputs by summing the product of $\alpha\phi$ from the first buffer 210 with the product $(1-\alpha)\psi$ from the second buffer 220 with an intention to generate an interpolated clock output signal having a phase of $\alpha\phi+(1-\alpha)\psi$.

Figure 2B:
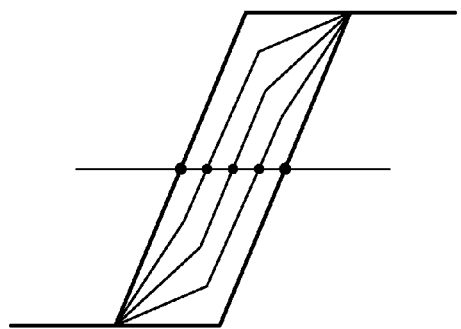
FIG. 2B illustrates clock signals having substantially overlapping clock edges.
Figure 2C:
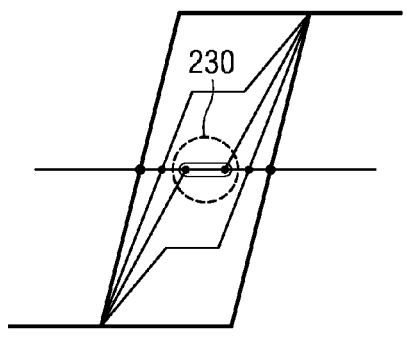
FIG. 2C illustrates clock signals having non-overlapping clock edges.

FIG. 2B illustrates the intended (correct) operation of the interpolator that occurs with clock signals having substantially overlapping clock edges, whereas FIG. 2C illustrates incorrect operation for clock signals having non-overlapping clock edges. As shown in FIG. 2B, where 5 different interpolated outputs are presented with $\alpha$ changing uniformly from 1.0 to 0.0 in decrements of 0.25, zero crossings of these waveforms (shown as dots), are distributed uniformly indicating that the output phase indeed has a desired linear dependence on phases ϕ, ψ and weight $\alpha$. For example, the left most edge in FIG. 2B represents a clock signal ϕ having an interpolation weight $\alpha$ of 1, and clock signal $\psi$ having interpolation weight $(1-\alpha)$ of 0, the next dot to the right represents an interpolation weights of 0.75/0.25, the next dot represents an interpolation weights of 0.5/0.5, the next dot represents an interpolation weights of 0.25/0.75, and the right most edge represents an interpolation weights of 0/1.

To better understand the need for overlapping clock edges, one first needs to see the impact of non-overlap on interpolator performance. In order to see the impact of non-overlap on phase interpolator performance, one needs to calculate the relationship between a small change in weight $\alpha$ and a corresponding small change in clock time delay t, i.e. to see the partial derivative of delay t (defined as time of zero crossing), on $\alpha$ (i.e. $dt/d\alpha$). The desired behavior is having $dt/d\alpha$ be nearly constant so that uniform steps in $\alpha$ cause uniform steps in t, as shown in FIG. 2B, and hence uniform steps in phase, which differs from delay only be a scaling parameter −360 degrees of phase correspond to a time delay t of one clock period. The derivative dt/dα in turn is a ratio of two derivatives, the first derivative is that of the voltage value v of the interpolated clock on α, i.e. dv/dα which is well behaved regardless of overlap, and the second is a derivative of voltage value v on time (dv/dt) which is a simple time derivative of the interpolated clock, so dt/dα=(dv/dα)/(dv/dt). The problem with non-overlapping clocks is that in the non-overlap zone, where both clock phase signals become constant at once, because the early one has stopped transitioning, while the late one did not yet start, the latter derivative dv/dt can approach zero—as indicated by a flat middle portion of waveforms in FIG. 2C. Therefore, the ratio (dv/dα)*(dv/dt) approaches infinity due to zero denominator, i.e. small change in a causes a large jump in delay, particularly near α=0.5 where delay t becomes undefined (zero crossing becomes a range instead of a well-defined dot in FIG. 2C.

Thus, as shown in FIG. 2B, for input clock signals having substantially overlapping clock edges, the delay of the output clock signal, defined as a time of its zero crossings has a linear dependence on weight coefficient α, thus resulting in good interpolator phase linearity. In addition, in FIG. 2B all interpolated waveforms cross zero at the same rate as the input clock phase signals, thus resulting in well-defined zero crossings and hence low output clock jitter.

As shown in FIG. 2C, when the input clock signals do not have overlapping edges, the zero crossings are spaced in a highly non-uniform fashion which makes such interpolator unusable for high-precision control of the phase of output clock signal. In addition, an area 230 is generated where there is an undefined zero crossing moment. Such undefined zero crossing moments result in high timing jitter since even small changes in the value of the clock signal near that region (caused, for example by crosstalk from nearby switching circuits) will cause very large changes in the clock delay defined as a moment of the zero crossing. Thus, it is important to be able to provide clock inputs to the clock phase interpolator that have substantially mutually overlapping edges so as to ensure the linear dependence of output clock delay on weight coefficient α, and hence ability to control that delay with high precision that is necessary for proper operation of the clock phase interpolator. In order to ensure such clock inputs are being provided to the clock phase interpolator, the illustrative embodiments provide clock conditioning input buffers for clock phase interpolators.

Figure 3A:
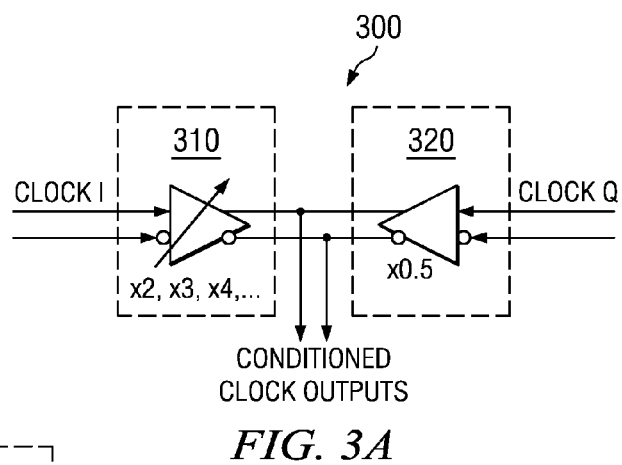
FIG. 3A is an exemplary block diagram of a clock conditioning input buffer for a clock phase interpolator in accordance with one illustrative embodiment.

FIG. 3A is an exemplary block diagram of a clock conditioning input buffer for a clock phase interpolator in accordance with one illustrative embodiment. Two such buffers are necessary to operate a phase interpolator such as shown in FIG. 2A, for example, one for phase φ and another for phase ψ.

As shown in FIG. 3A, the clock conditioning input buffer 300 is comprised of two primary parts, a main variable strength clock buffer 310 and an additional fixed strength buffer 320, referred to herein as the de-emphasis cell, that form a clock interpolator, similar to the one shown in FIG. 2A. The main buffer 310 implements a function of a limited-bandwidth filter with a time constant determined by its circuit parameters, i.e. by the ratio of its effective capacitive load to its driving strength, that is by its effective RC time constant. Use of a variable strength buffer is made where a relatively large total operation frequency range is subdivided into several frequency sub-bands, with each sub-band being served by one setting of the buffer strength. A function of the variable strength of the buffer can be achieved by using a parallel bank of identical drivers (not shown), with some drivers being selectively enabled, and some disabled, that jointly drive one common load. However, more hardware-efficient implementations of this same function are also possible.

The de-emphasis cell, 320 receives a lagging clock phase with respect to the phase applied to the main variable strength clock buffer 310. Practically this means that both of these two phases are taken from a set of multiple clock phases normally present in the clock phase interpolation circuitry. For example, if the set consists of four quadrature clock phases at 0, 90, 180, and 270 degrees, or four mutually delayed clock signals, and the main clock phase is phase 0, also referred to as phase IP, then the lagging phase is phase 90 (also referred to as phase QP). Likewise, if the main phase is phase 90 (i.e. phase QP), then the lagging phase is phase 180 (i.e. phase IN), where I and Q refer to "in-phase" and quadrature clock signals, respectively, and suffixes P and N refer to positive and negative polarity, respectively.

In comparison with the main variable strength buffer 310, the strength of the de-emphasis cell 320 is relatively low and fixed. In the provided example, the main variable strength buffer 310 can have a selectable strength of 2, 3 or 4 units, while the de-emphasis cell 320 has a fixed strength of 0.5 units. Therefore the two-tap transversal filter formed by these two buffers 310 and 320 has a variable tap ratio ranging from 2 to 0.5 for the lowest strength of the main variable strength buffer 310 to 4 to 0.5 for the maximum strength of the main variable strength buffer 310. The reasoning behind such arrangement is as follows: the highest strength setting of the main variable strength buffer 310 (4 units) results in the shortest time constant of the main variable strength buffer 310 and is used for operation at the maximum frequency range, where natural bandwidth limitations within the circuit are the most pronounced. Hence little or no extra help is needed from the transversal filtering mechanism—which is achieved by having the minimum relative weight of the de-emphasis cell 320 tap of 0.5:4. However, when the lowest strength of the main variable strength buffer 310 is used, which results in its maximum time constant and is used at the lowest operating frequency, the impact of general bandwidth limitations of the circuit is the lowest. Thus, more filtering from the transversal mechanism is desired which is achieved due to a higher tap ratio which increases from 0.5:4 to 0.5:2.

The net result of the operation of the de-emphasis cell 320 is to artificially stretch the clock rising and falling edges over a distance equal to the separation of the main clock phase and an additional lagging clock phase, which is a fixed portion of a clock period and hence, changes proportionally with this clock period. Therefore, the time constant of the clock conditioning buffer 300 partially tracks the clock frequency, i.e. due to the de-emphasis cell 320, without using any complex hardware, such as a closed loop feedback system and/or delay generators.

The function performed by the clock conditioning buffer 300 is similar to a two-tap low-pass transversal filter, which generates a weighted sum of several mutually delayed copies of its input signal, that has several available settings for the weight of the first (main) tap and fixed value of the second (post-cursor) tap. Besides transversal filter action, the clock conditioning buffer 300 utilizes regular low-pass filtering action of its components that arises from finite driving strength of the buffer 300 and finite capacitance of the buffer 300 load, which form together a simple first-order RC filter. Variable driver strength of the main variable strength buffer 310 results in variable resistance R and hence, variable RC time constant (e.g. doubling of the driver strength results in a reduction of its effective resistance R by a factor of 2, and hence a reduction of RC time constant by 2 as well). This first-order RC filtering action creates additional shaping of the clock waveforms.

Figure 3B:
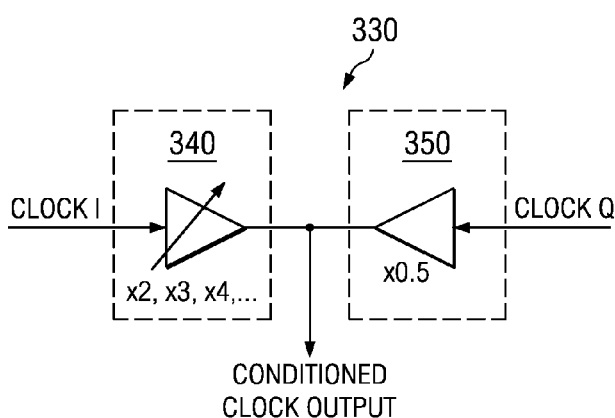
FIG. 3B is an exemplary block diagram of a clock conditioning input buffer for a clock phase interpolator in accordance with another illustrative embodiment.

The embodiment illustrated in FIG. 3A is for a differential clock conditioning buffer. FIG. 3B illustrates a single-ended clock conditioning buffer 330 in which each of the main buffer 340 and the de-emphasis cell 350 receive a single input and the single-ended clock conditioning buffer 330 provides a single conditioned clock output signal. As shown in FIG. 3B, the main buffer 340 receives clock I while the de-emphasis cell 350 receives clock Q. The outputs of the main buffer 340 and the de-emphasis cell 350 are coupled to each other such that the outputs are combined to generate a single conditioned clock output signal. Again, the main buffer 340 of the single-ended clock conditioning buffer 330 has a variable strength while the de-emphasis cell 350 has a fixed strength that is weaker than the strength of the main buffer 340.

Thus, with the mechanisms of the illustrative embodiments, a clock conditioning buffer is provided that implements a two-tap transversal filter without having to introduce additional bulky hardware, such as feedback loops or the like, or introducing bulky delay lines. The clock conditioning buffer utilizes the clock phase generation circuitry already present in the clock phase interpolator circuitry to provide the necessary delayed inputs to the transversal filter. As a result, the clock conditioning buffer provides a transversal filter with negligible additional power and integrated circuit chip area requirements.

The conditioning buffer includes a first buffer and a second buffer, with a fixed or variable strength, that receive their respective inputs from a set of mutually delayed clock signals, such as a set of N equidistant clock phases with mutual delay of 360/N degrees, to form a two-tap transversal filter that is insensitive to changes in Process, Temperature, and Voltage (PVT). Use of an equidistant set of clock phases makes the time constant of such transversal filter proportional to the clock period thus making it insensitive to changes in clock frequency as well. Such transversal filtering action operated in conjunction with natural bandwidth limitations of the buffers yields an efficient clock conditioning circuit that is highly insensitive to PVT and clock frequency variations. The resulting clock conditioning buffer controls the duration of the clock edges to achieve high-linearity interpolation in a clock phase interpolator that receives the output of the clock conditioning buffer.

With reference again to FIG. 1 it should be appreciated that, in one illustrative embodiment, one single ended clock-conditioning buffer 330 is provided for each of the inputs, i.e. the fixed phase clock signals, to the clock phase interpolator of FIG. 1. Thus, for example, if the clock phase interpolator uses 4 phases, or four mutually delayed clock signals, such as shown in FIG. 1 (although 8 inputs are shown with suffixes P and N, there are only 4 actual phases, e.g., 0 degrees$_n$, is the same as 180 degrees$_n$), four single-ended clock conditioning buffers 330 may be used receiving phases 0, 90, 180, and 270 at their main input, respectively, and phases 90, 180, 270, and 0 (i.e., the same phases, just rearranged for extra 90 degrees of delay) at their de-emphasis input, respectively. A single-ended version of clock conditioning buffer 300 receives a single clock input signal phase at each of the inputs to the main variable strength buffer 310 and the de-emphasis cell 320.

Rather than using single ended versions of clock conditioning buffers 300, differential current-mode logic (CML) circuits, such as depicted in FIG. 3A, may be used. With such an embodiment, only 2 differential conditioning buffers, instead of 4 single-ended conditioning buffers, may be used to operate the clock phase interpolator, each differential conditioning buffer receiving a full set of 4 input clock phases. Each differential conditioning buffer may output two conditioned clock signals which may then be input to the clock phase interpolator.

Figure 4A:
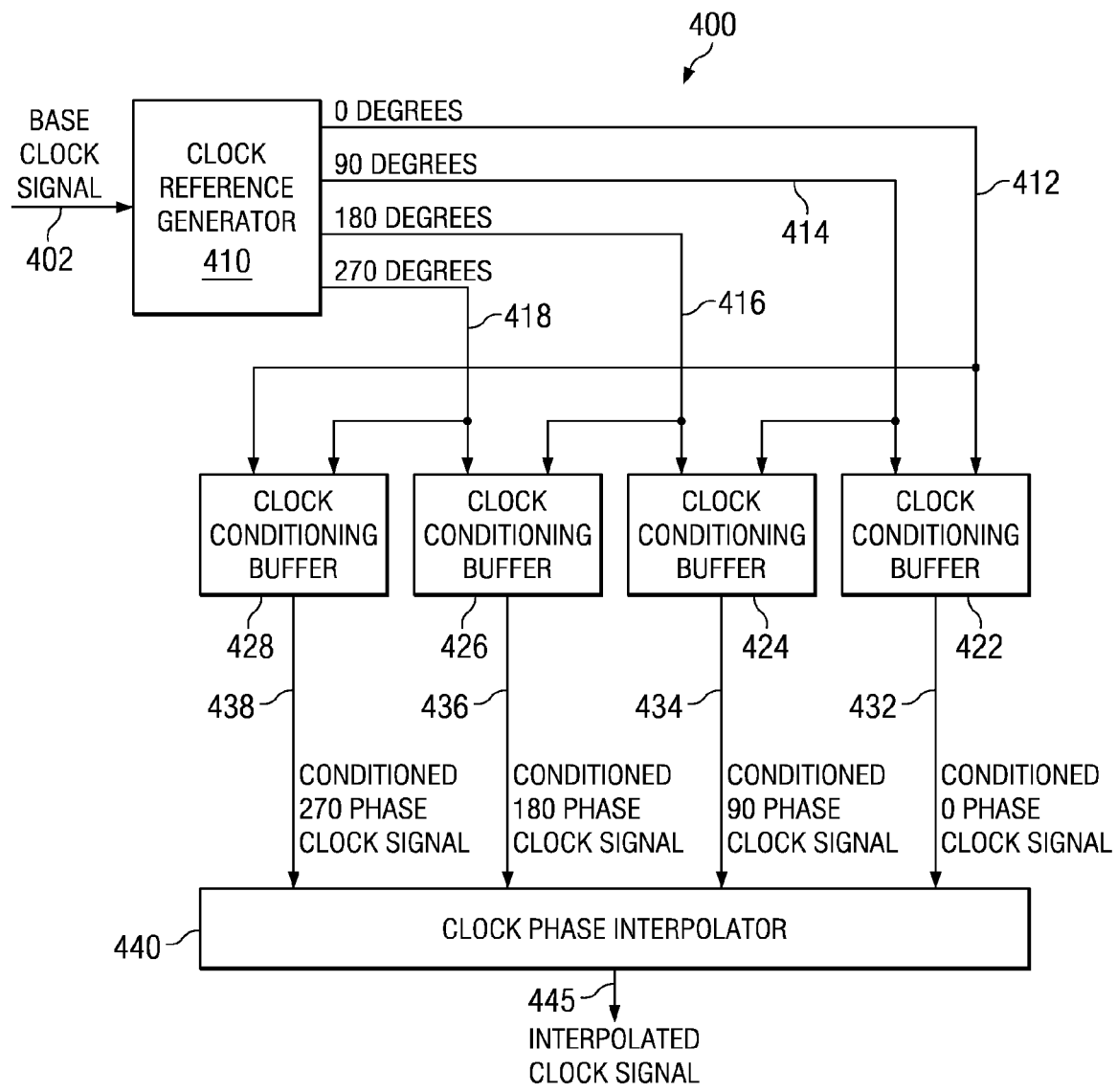
FIG. 4A is an exemplary block diagram of a clock phase interpolator with a first implementation of the clock conditioning input buffer implemented therein in accordance with one illustrative embodiment.

FIG. 4A is an exemplary block diagram of a clock phase interpolator with a first implementation of a clock conditioning input buffer implemented therein in accordance with one illustrative embodiment. With this clock phase interpolator 400, the clock conditioning input buffers are single-ended buffers receiving a single clock phase input at each of the main variable strength buffer 310 and the de-emphasis cell 320.

As shown in FIG. 4A, the clock phase interpolator 400 includes a quadrature clock generator 410 that receives an input reference clock signal 402 and generates four clock signals 412-418 having four different phases (0, 90, 180, and 270 degrees) at its output. These four clock signals 412-418 are input to respective inputs of four clock conditioning buffers 422-428. For example, a first clock conditioning buffer 422 receives as inputs the clock signals 412 (0 degree phase) and 414 (90 degree phase), clock signal 412 being input to the main variable strength buffer and clock signal 414 being input to the de-emphasis cell of the clock conditioning buffer 422. A second clock conditioning buffer 424 receives as inputs the clock signals 414 (90 degree phase) and 416 (180 degree phase), clock signal 414 being input to the main variable strength buffer and clock signal 416 being input to the de-emphasis cell of the clock conditioning buffer 424. A third clock conditioning buffer 426 receives as inputs the clock signals 416 (180 degree phase) and 418 (270 degree phase), clock signal 416 being input to the main variable strength buffer and clock signal 418 being input to the de-emphasis cell of the clock conditioning buffer 426. A fourth clock conditioning buffer 428 receives as inputs the clock signals 418 (270 degree phase) and 412 (0 degree phase), clock signal 418 being input to the main variable strength buffer and clock signal 412 being input to the de-emphasis cell of the clock conditioning buffer 428.

The four clock conditioning buffers 422-428 output four conditioned clock signals 432-438 to the 4-input clock phase interpolator 440. This 4-input clock phase interpolator 440 may have a similar configuration as that shown in FIG. 1, for example. Based on the enablement/disabling of switches in the 4-input clock phase interpolator 440, a particular phase of the reference clock input 402 can be produced, e.g., one of 16 phases of a reference clock with steps corresponding to 360 degrees divided by 16 may be selected. It should be appreciated that, alternatively, other types of clock phase interpolators may be used without departing from the spirit and scope of the illustrative embodiments.

Figure 4B:
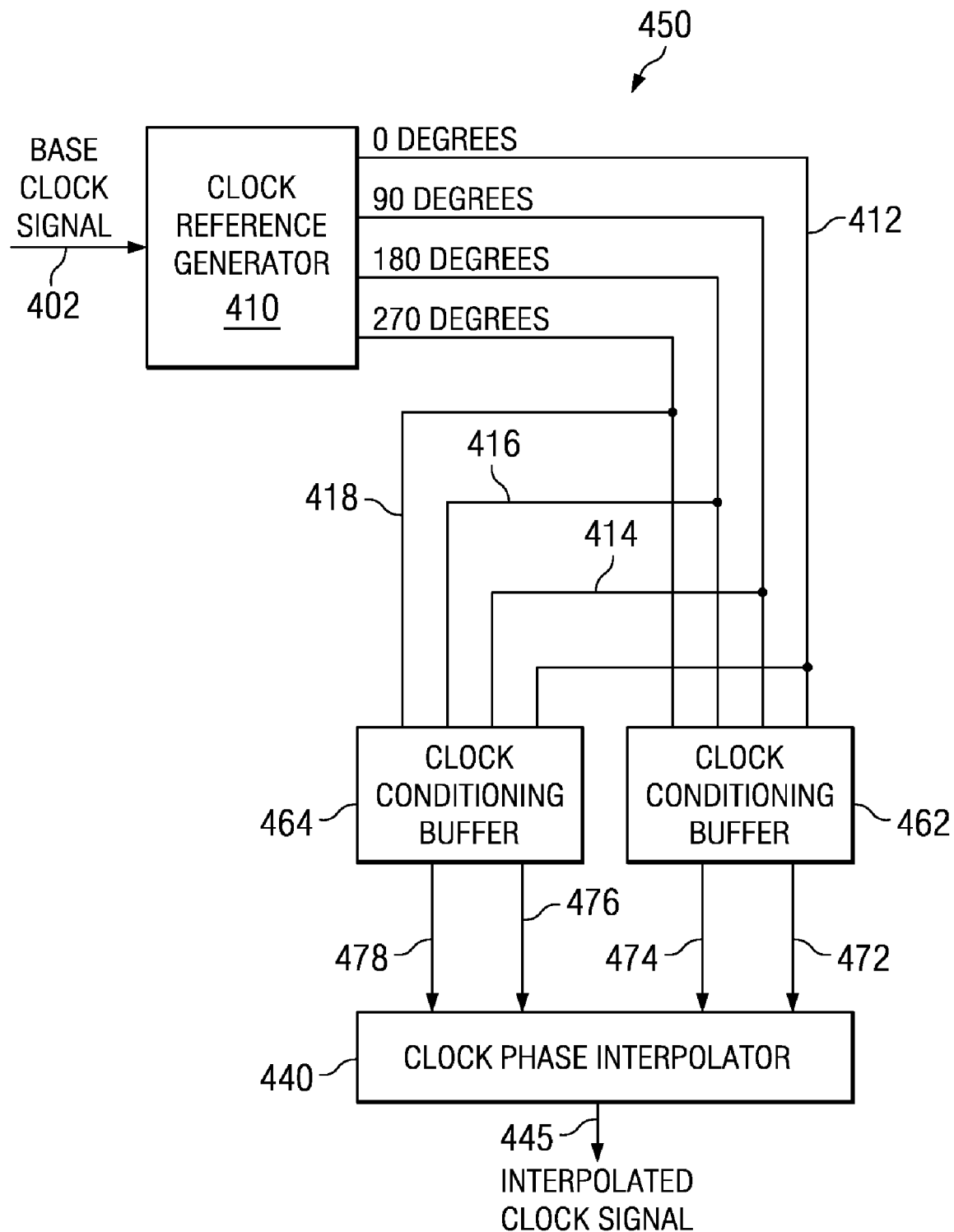
FIG. 4B is an exemplary block diagram of a clock phase interpolator with a second implementation of the clock conditioning input buffer implemented therein in accordance with one illustrative embodiment.

FIG. 4B is an exemplary block diagram of a clock phase interpolator with a second implementation of a clock conditioning input buffer implemented therein in accordance with one illustrative embodiment. With this clock phase interpolator 450, the clock conditioning input buffers are differential buffers receiving a pair of clock phase inputs at each of the main variable strength buffer 310 and the de-emphasis cell 320.

As shown in FIG. 4B, the clock phase interpolator 450 includes a quadrature clock generator 410, similar to that of FIG. 4A, that receives an input reference clock signal 402 and generates four clock signals 412-418 having four different phases (0, 90, 180, and 270 degrees) at its output. These four clock signals 412-418 are input to respective inputs of two clock conditioning buffers 462-464. For example, a first clock conditioning buffer 462 receives as inputs the clock signals 412 (0 degree phase) and 416 (180 degree phase) at the main variable strength buffer, and clock signals 414 (90 degree phase) and 418 (270 degree phase) at the de-emphasis cell of the clock conditioning buffer 462. A second clock conditioning buffer 464 receives as inputs the clock signals 414 (90 degree phase) and 418 (270 degree phase) at the main variable strength buffer, and clock signals 416 (180 degree phase) and 412 (0 degree phase) at the input to the de-emphasis cell of the clock conditioning buffer 464.

The two clock conditioning buffers 462-464 each output two conditioned clock signals for a total of four conditioned clock signals 472-478 that are input to the 4-input clock phase interpolator 440, which may be the same clock phase interpolator 440 of FIG. 4A. As with the embodiment in FIG. 4A, it should be appreciated that, alternatively, other types of clock phase interpolators may be used without departing from the spirit and scope of the illustrative embodiments.

Thus, the illustrative embodiments provide a clock conditioning buffer that matches the time constant of the clock conditioning buffer to the input clock frequency by taking advantage of other clock phases available in the existing clock phase interpolator circuitry, e.g., the reference clock generator. In this way, the clock conditioning buffer of the illustrative embodiments avoids the need to include feedback loops and/or delay lines that would otherwise be necessary and which add to the power consumption and area requirements of the overall circuitry. Thus, the mechanisms of the illustrative embodiments reduce power and integrated circuit chip area requirements for achieving time constant and frequency matching resulting in better shaping of the output clock signal and hence, better linearity of the subsequent clock interpolator circuit fed by the conditioned clock signals.

It should be appreciated that while the above illustrative embodiments are directed to the conditioning of clock input signals, the present invention is not limited to such. Rather, the mechanisms of the illustrative embodiments may be applied to other types of signals that requiring such conditioning. Thus, the mechanisms of the illustrative embodiments may be implemented for the conditioning of any signal and are not limited to only conditioning clock signals or limited to use with clock phase interpolators.

The circuit as described above may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design may then converted into the appropriate format (e.g., GDSII) for the fabrication of photolithographic masks, which typically include multiple copies of the chip design in question that are to be formed on a wafer. The photolithographic masks may be utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, electronic toys, game consoles, hand-held computing devices, personal digital assistants, communication devices, such as wireless telephones and the like, laptop computing devices, desktop computing devices, server computing devices, or any other computing device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A conditioning buffer circuit, comprising:
a first buffer that receives a first input signal; and
a second buffer, coupled to the first buffer, that receives a second input signal, wherein:
the first input signal has a first delay and the second input signal has a second delay different from the first delay,
the first input signal and the second input signal are signals obtained from a set of mutually delayed signals, and
the conditioning buffer circuit outputs a conditioned output signal based on a combination of a first output of the first buffer and a second output of the second buffer, wherein:
the second buffer has a weaker drive strength than the first buffer,
the drive strength of the second buffer is fixed, and
the first buffer is a variable strength buffer circuit having a variable drive strength.

2. The circuit of claim 1, wherein the first buffer and the second buffer are coupled to form an interpolator, having weights proportional to respective drive strengths of the first and second buffers, which operates as a two-tap transversal filter.

3. The circuit of claim 1, wherein the set of mutually delayed signals is a set of mutually delayed clock signals.

4. The circuit of claim 3, wherein the set of mutually delayed clock signals is a set of equidistant N clock signals having a phase difference of 360/N degrees.

5. The circuit of claim 3, wherein the conditioning buffer circuit outputs the conditioned output signal to a clock phase interpolator circuit.

6. The circuit of claim 5, wherein the set of mutually delayed clock signals comprises a first clock signal having a phase of 0 degrees, a second clock signal having a phase of 90 degrees, a third clock signal having a phase of 180 degrees, and a fourth clock signal having a phase of 270 degrees.

7. The circuit of claim 1, wherein the conditioning buffer circuit is integrated in an integrated circuit device.

8. The circuit of claim 7, wherein the integrated circuit device is part of an electronic product having one or more integrated circuit devices.

9. A clock phase interpolator circuit, comprising:
at least one clock generator circuit;
at least one clock conditioning buffer circuit coupled to the at least one clock generator circuit; and a clock phase interpolator coupled to the at least one clock conditioning buffer circuit, wherein each clock conditioning buffer circuit of the at least one clock conditioning buffer circuit comprises:
- a first buffer that receives a first clock input signal; and
- a second buffer, coupled to the first buffer, that receives a second clock input signal, wherein:
  - the first clock input signal has a first phase delay and the second clock input signal has a second phase delay different from the first phase delay,
  - the first clock input signal and the second clock input signal are clock signals obtained from a set of clock signals having different phase delays generated by the at least one clock generator circuit,
  - the conditioning buffer circuit outputs a conditioned clock output signal to the clock phase interpolator based on a combination of a first output of the first buffer and a second output of the second buffer,
  - the second buffer has a weaker drive strength than the first buffer,
  - the drive strength of the second buffer is fixed, and
  - the first buffer is a variable strength buffer circuit having a variable drive strength.

10. The clock phase interpolator circuit of claim 9, wherein conditioned output signals of two clock conditioning buffer circuits of the at least one clock conditioning buffer circuit have substantially overlapped edges.

11. A clock phase interpolator circuit, comprising:
at least one clock generator circuit;
at least one clock conditioning buffer circuit coupled to the at least one clock generator circuit; and
a clock phase interpolator coupled to the at least one clock conditioning buffer circuit, wherein each clock conditioning buffer circuit of the at least one clock conditioning buffer circuit comprises:
- a first buffer that receives a first clock input signal; and
- a second buffer, coupled to the first buffer, that receives a second clock input signal, wherein:
  - the first clock input signal has a first phase delay and the second clock input signal has a second phase delay different from the first phase delay,
  - the first clock input signal and the second clock input signal are clock signals obtained from a set of clock signals having different phase delays generated by the at least one clock generator circuit,
  - the conditioning buffer circuit outputs a conditioned clock output signal to the clock phase interpolator based on a combination of a first output of the first buffer and a second output of the second buffer,
  - the first buffer and the second buffer are coupled to form an interpolator, having weights proportional to respective drive strengths of the first and second buffers, which operates as a two-tap transversal filter.

12. The clock phase interpolator circuit of claim 9, wherein the set of clock signals having different phase delays generated by the at least one clock generator circuit comprises a set of equidistant N clock signals having a phase difference of 360/N degrees.

13. The clock phase interpolator circuit of claim 9, wherein the clock phase interpolator circuit is integrated in an integrated circuit device.

14. The clock phase interpolator circuit of claim 13, wherein the integrated circuit device is part of an electronic product having one or more integrated circuit devices.

15. The clock phase interpolator circuit of claim 9, wherein the at least one clock conditioning buffer circuit comprises a plurality of clock conditioning buffer circuits coupled to the at least one clock generator circuit and the clock phase interpolator, and wherein, for each clock conditioning buffer circuit, the first clock input signal has a first phase delay that is at least 90 degrees out of phase from that of the second clock input signal.

16. The clock phase interpolator circuit of claim 15, wherein the plurality of clock conditioning buffer circuits comprises:
- a first clock conditioning buffer circuit having a first clock input signal with a 0 degree phase and a second clock input signal with a 90 degree phase;
- a second clock conditioning buffer circuit having a first clock input signal with a 90 degree phase and a second clock input signal with a 180 degree phase;
- a third clock conditioning buffer circuit having a first clock input signal with a 180 degree phase and a second clock input signal with a 270 degree phase; and
- a fourth clock conditioning buffer circuit having a first clock input signal with a 270 degree phase and a second clock input signal with a 0 degree phase.

17. The clock phase interpolator circuit of claim 9, wherein each clock conditioning buffer circuit in the at least one clock conditioning buffer circuit receives more than two clock input signals.

18. The clock phase interpolator circuit of claim 17, wherein the more than two clock input signals comprises at least four clock input signals, each clock input signal having a phase that is at least 90 degrees out of phase from each other clock input signal.

19. The clock phase interpolator circuit of claim 17, wherein the at least one clock conditioning buffer circuit comprises two clock conditioning buffer circuits, and wherein each clock conditioning buffer circuit receives the first clock input signal with a 0 degree phase, the second clock input signal with a 90 degree phase, a third clock input signal with a 180 degree phase, and a fourth clock input signal with a 270 degree phase.

* * * * *